United States Patent [19]

Ewing, Jr.

[11] Patent Number: 5,081,835
[45] Date of Patent: Jan. 21, 1992

[54] ECCENTRIC FLAP NOZZLE

[75] Inventor: Joseph H. Ewing, Jr., Lake Park, Fla.

[73] Assignee: United Technologies Corporation, Hartford, Conn.

[21] Appl. No.: 597,937

[22] Filed: Oct. 12, 1990

[51] Int. Cl.$^5$ .............................................. F02K 1/00
[52] U.S. Cl. .................................... 60/230; 60/232
[58] Field of Search ............. 60/228, 230, 232, 226.2; 239/265.19, 265.33, 265.35, 265.37; 244/12.5, 110 B, 75 R

[56] References Cited

U.S. PATENT DOCUMENTS

4,819,876  4/1989  Thayer ................................ 60/232

Primary Examiner—Louis J. Casaregola
Assistant Examiner—Howard R. Richman
Attorney, Agent, or Firm—Christopher T. Hayes

[57] ABSTRACT

Disclosed is a two-dimensional nozzle for a gas turbine engine which, through the use of divergent flaps mounted on pivot shafts eccentric to the side disks in which they are received, provides thrust vectoring and low observability flight operation.

13 Claims, 7 Drawing Sheets

ECCENTRIC FLAP NOZZLE

The invention was made under a U.S. Government contract and the Government has rights herein.

DESCRIPTION

1. Technical Field

The present invention relates to thrust vectoring exhaust nozzles having movable members for directing the flow of exhaust gases from gas turbine engines.

2. Background Art

The use of thrust vectoring exhaust nozzles in high performance jet aircraft is well known in the art. Such nozzles typically redirect a portion of the exhaust gas exiting the aircraft gas turbine engine for the purpose of enhancing aircraft maneuverability or takeoff thrust. One particular type of thrust vectoring nozzle is termed "two dimensional" by virtue of its having a roughly rectangular exhaust flow path defined by two laterally spaced apart static side walls and two vertically spaced apart movable surfaces or flaps. The movable flaps operate to direct the exhaust gas flow as desired to produce varying degrees of thrust vectoring in the vertical plane.

In addition to thrust vectoring, manufacturers of high performance aircraft are also interested in achieving two other nozzle operating characteristics. First, under some circumstances it may be desirable to prevent line of sight viewing of the turbine components, or "hot section", while the aircraft is operating at certain flight conditions, thus achieving so called "low observability". Second, manufacturers are interested in providing aircraft with vertical take off and landing (VTOL) capabilities which allow aircraft to take off and land without the need for aircraft runways.

As with any aircraft related component or structure, the weight and complexity of such nozzles is of particular concern to designers. Prior art two dimensional nozzles, relying on complex linkages between a multiplicity of movable components, have generally proved to be undesirable in terms of weight and complexity. What is needed is a strong, simple nozzle arrangement and actuation means which can achieve the desired thrust vectoring, VTOL, and low observability characteristics at a minimum total weight.

DISCLOSURE OF THE INVENTION

It is therefore an object of the present invention to provide a two dimensional thrust vectoring exhaust nozzle for a gas turbine engine or the like.

It is further an object of the present invention to provide a convergent-divergent exhaust nozzle wherein thrust vectoring is achieved by orienting surfaces in the convergent-divergent section of the nozzle so as to selectively direct the exhaust gases.

It is further an object of the present invention to provide an actuator system for orienting the divergent surfaces of the nozzle to independently achieve both a varying divergent exhaust gas flow path and selectively varying degrees of vectored thrust.

It is a still further object of the present invention to provide an exhaust nozzle which is operable to prevent direct viewing of the hot section of the gas turbine engine through the divergent section.

According to the present invention, a two dimensional convergent-divergent exhaust nozzle is disclosed which is operable in two flight modes and a blocked nozzle mode for VTOL. The present invention includes two laterally spaced apart side walls, each of which has an upper and lower side disk rotatively mounted therein. Upper and lower flap assemblies span between the side walls, each assembly including a seal flap aft of the transition section of the nozzle and a vectoring flap aft of the seal flap.

Each of the vectoring flaps is mounted to a pivot shaft therein, the ends of which extend through pivot shaft holes in the corresponding side disks. The pivot shaft hole of each side disk is eccentric to the center of rotation thereof, and each pivot shaft is free to rotate within the pivot shaft holes in which it is received. Orientation of the vectoring flaps is achieved by actuators, operating through load arms attached to each of the pivot shaft ends, which selectively position the vectoring flaps.

The seal flaps direct the exhaust gas to flow either between the vectoring flaps, or exterior to the vectoring flaps. Each of the seal flaps is fixedly secured to a seal shaft therein, the ends of which extend through seal shaft holes in the side walls. Like the vectoring shafts, each seal shaft is free to rotate within the seal shaft holes in which it is received, and each seal flap is oriented by actuators operating through load arms attached to the ends of each seal shaft, which selectively position seal flaps.

In the vectored thrust flight mode, the seal flaps direct all of the exhaust gas to flow between the vectoring flaps. The trailing edge of each seal flap maintains contact with the adjacent vectoring flap to prevent the exhaust gas from flowing around the outer surfaces of the vectoring flaps. The desired throat area is achieved by simultaneously rotating the side disks in opposite directions, thereby increasing or decreasing the vertical distance between the vectoring flaps. The desired exhaust area is achieved by rotating the vectoring flaps to selectively space the trailing edges thereof, and thrust vectoring is achieved by rotating the vectoring flaps with respect to the side disks to obtain the desired angle of thrust.

To provide low observability, the side disks rotate to draw the vectoring flaps into contact with each other, preventing flow of the exhaust gas therebetween. The desired throat area is achieved by rotating the upper and lower seal flaps, thereby controlling the flow area between each seal flap and the adjacent vectoring flaps. The flow passages formed by each of the seal flaps and the adjacent vectoring flap are curved so as to prevent line of sight viewing of the hot section.

In the VTOL mode, the side disks rotate to draw the vectoring flaps into contact with each other as in the low observability mode. In addition, the seal flaps rotate to seal the flow passages between the seal flaps and the adjacent vectoring flaps, preventing exhaust gas flow therebetween. The exhaust gas is thus prevented from exiting the nozzle through the flap assemblies, and may be ducted through other ports in the nozzle or engine to provide for VTOL aircraft operations.

The foregoing and other features and advantages of the present invention will become more apparent from the following description and accompanying drawings.

BEST MODE FOR CARRYING OUT THE INVENTION

Figure 1:
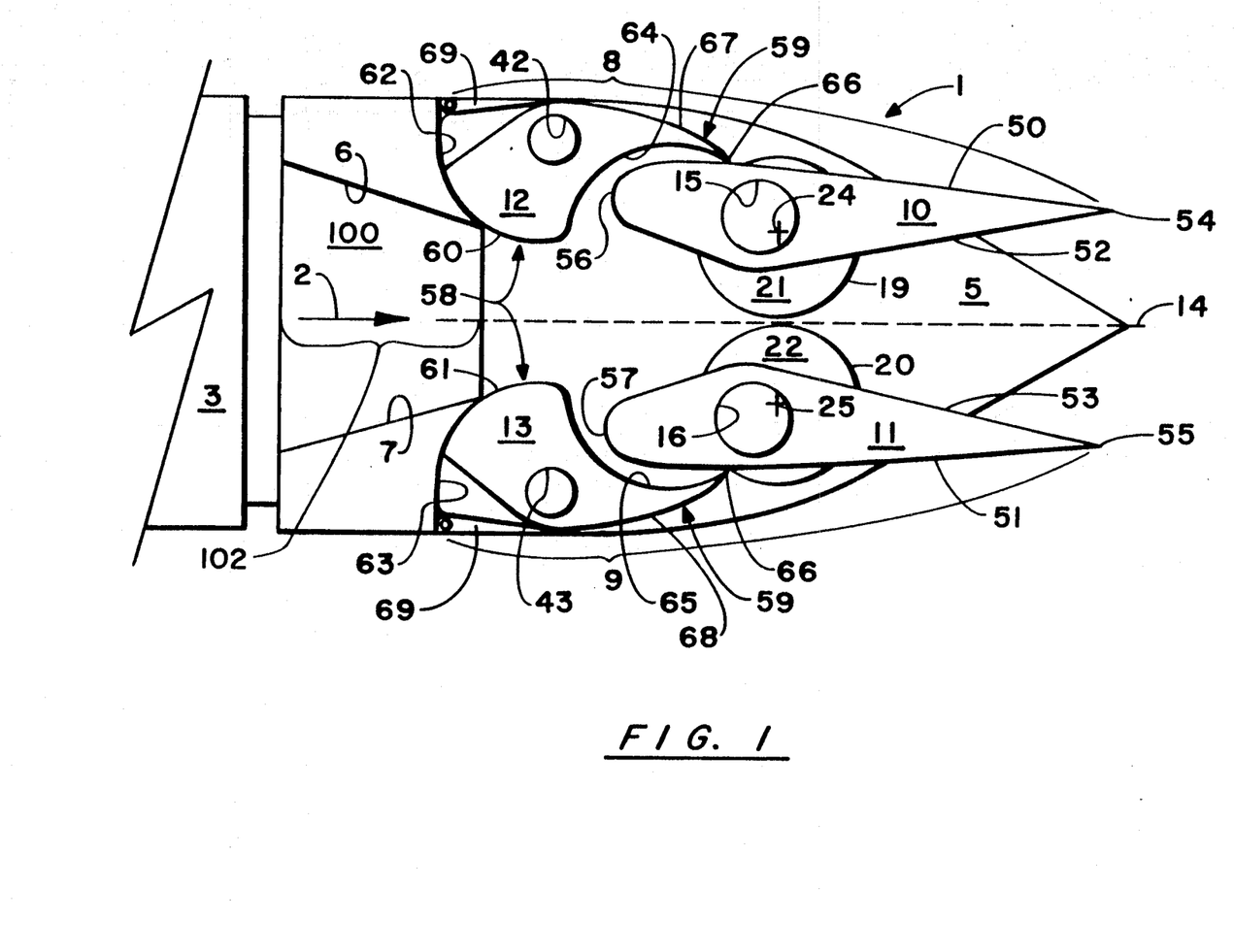
FIG. 1 is a cross-sectional schematic view of a nozzle of the present invention taken along line 1—1 of FIG. 2.
Figure 2:
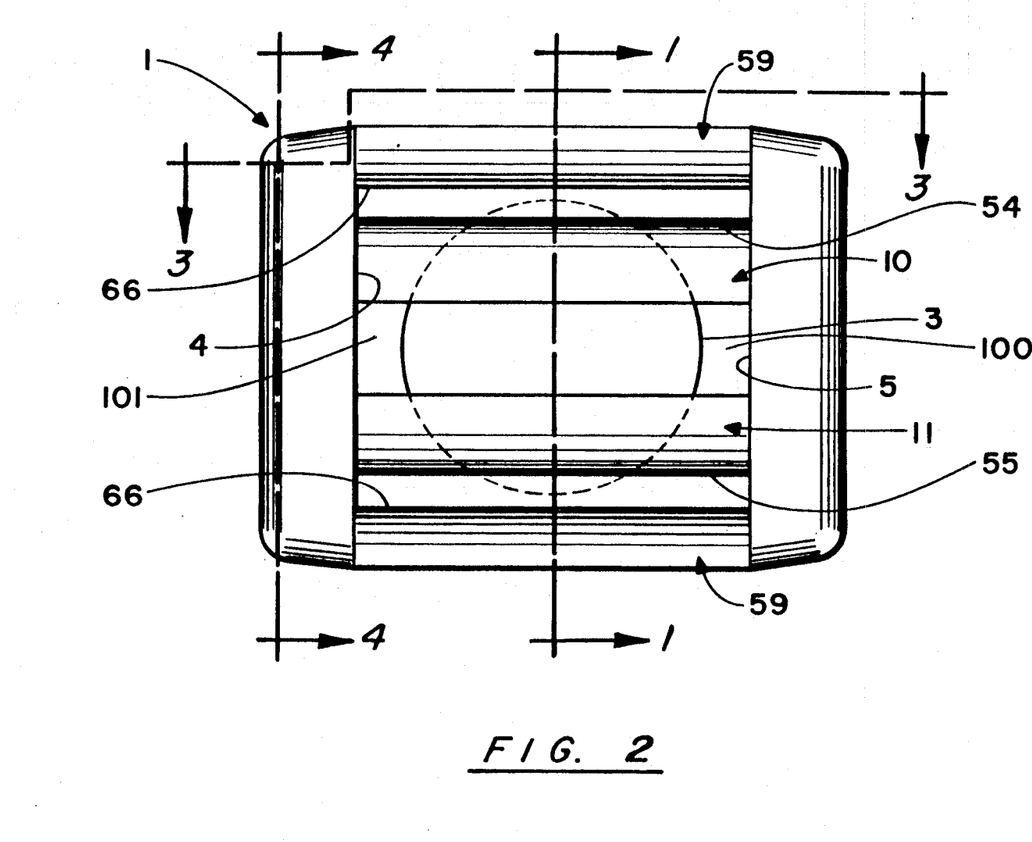
FIG. 2 is an end view looking forward of the nozzle of the present invention.
Figure 3:
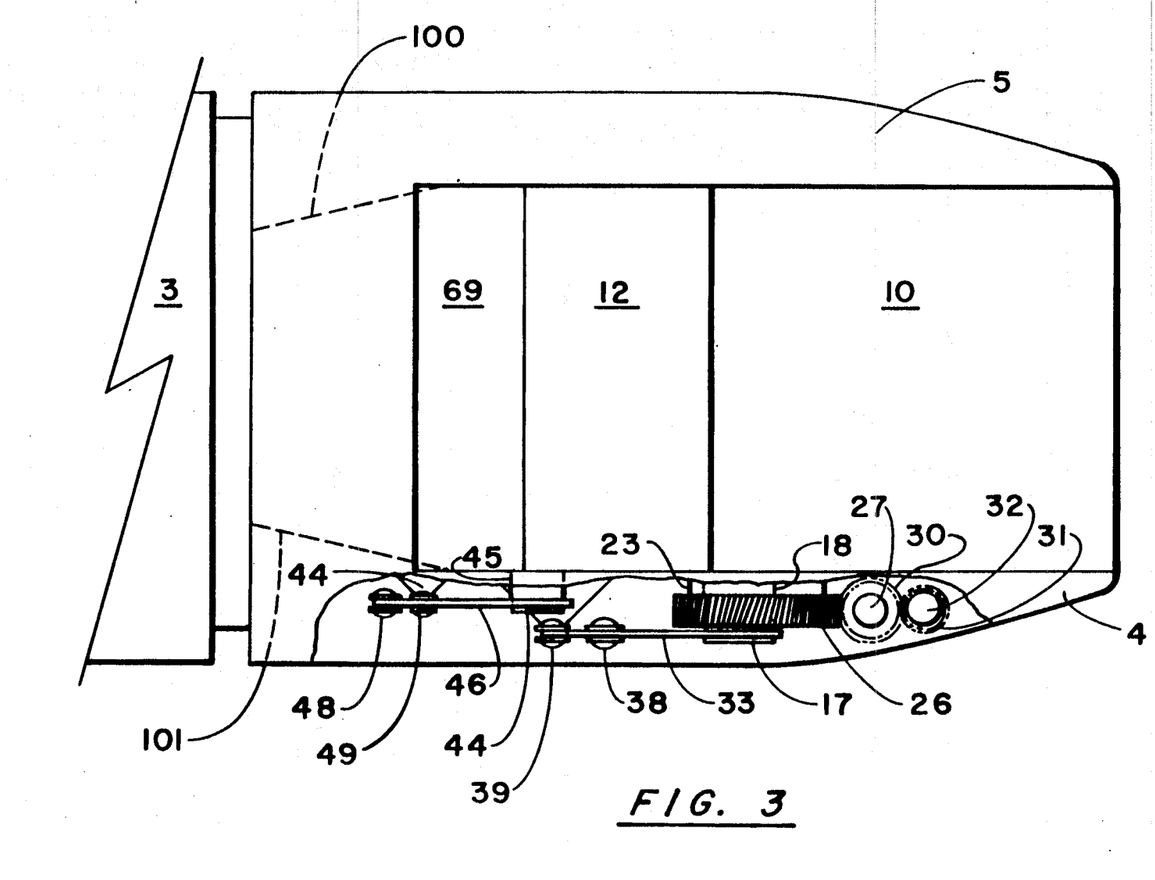
FIG. 3 is a partial cut-away top view of the nozzle of the present invention taken along line 3—3 of FIG. 2.

FIG. 1 shows a cross sectional schematic arrangement of an exhaust nozzle 1 according to the present invention. Exhaust gas 2 from a gas turbine engine 3 flows axially aftward in a flow passage having lateral boundaries defined by the walls 100, 101 of the round-to-rectangular transition section 102 as shown in FIG. 3, as well as the inner surfaces of the laterally spaced side walls 4, 5 as shown in FIG. 2. The upper and lower exhaust gas flow boundaries are defined by the upper and lower surfaces of the transition sections 6, 7 and the upper and lower movable flap assemblies 8, 9 each of which includes a vectoring flap 10, 11 and a seal flap 12, 13.

The flow passage aft of the transition section 102 is rectangular in cross section and generally symmetrical about horizontal and vertical planes passing through the nozzle central axis 14. The vectoring flaps 10, 11 extend spanwisely between the side walls 4, 5 and are each fixedly secured to corresponding pivot shafts 15, 16 disposed therein which also extend spanwisely across the nozzle 1. The ends 17 of the pivot shafts 15, 16 extend through pivot shaft holes 18 in pivot members 19, 20 rotatably mounted in the side walls 4, 5, as shown in FIG. 3. Each pivot shaft hole 18 rotatably receives the pivot shaft 15, 16 located therein to provide for selective positioning of the vectoring flaps, 10, 11 as described below.

In the preferred embodiment, each of the pivot members 19, 20 is a side disk 19, 20 having a planar face 21, 22 which is substantially flush with the inner surface of the particular side wall 4, 5 in which it is mounted. A side disk shaft 23 extending through the particular side wall 4, 5 defines the center of rotation 24, 25 of the side disk 19, 20 and connects the face 21, 22 with a ring gear 26, 35 mounted in the particular side wall, 4, 5 as shown in FIG. 3. Each pivot shaft hole 18 is eccentric to the center of rotation 24, 25 of the side disk 19, 20 in which it is located to provide for displacement of the vectoring flaps 10, 11.

Figure 4:
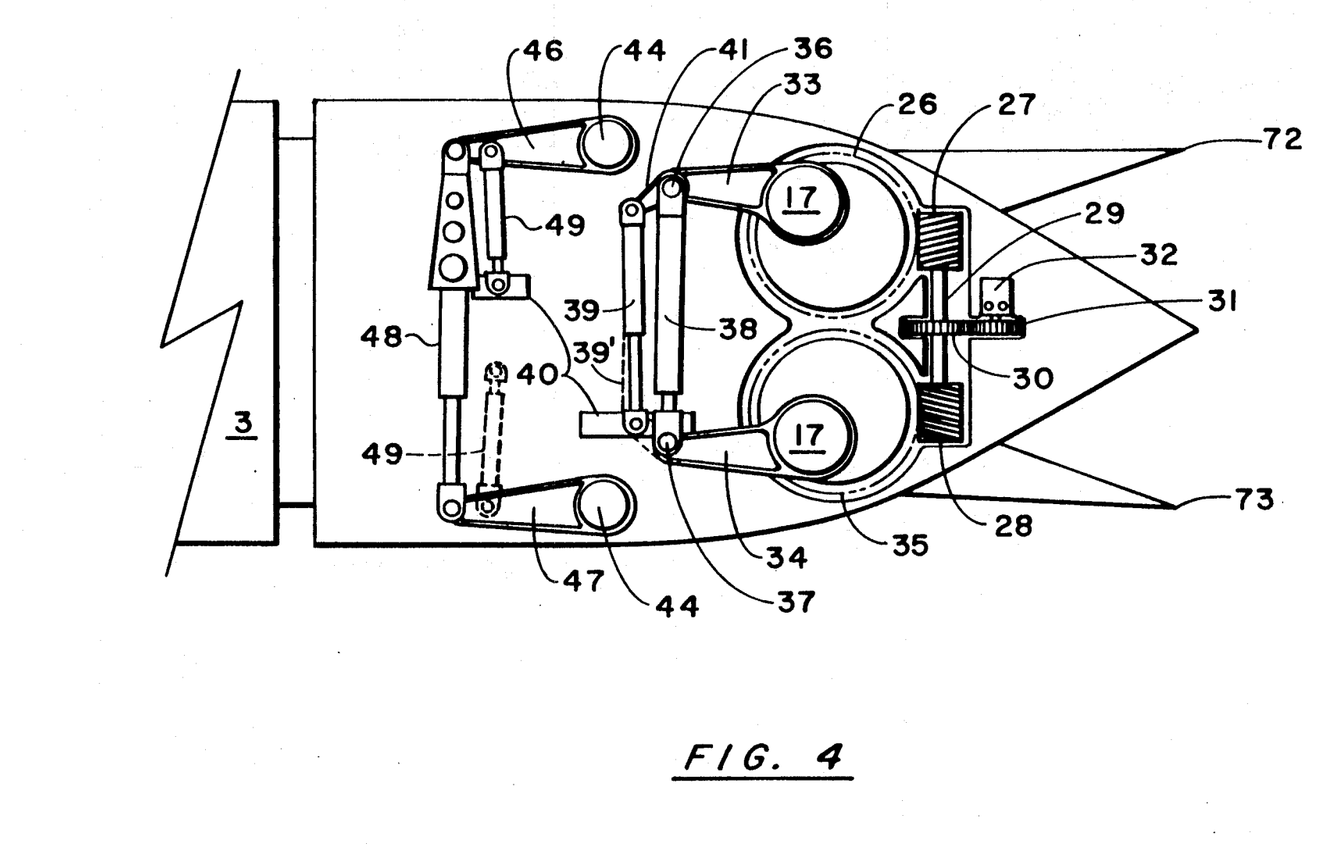
FIG. 4 is a cross-sectional view of the nozzle of the present invention taken along line 4—4 of FIG. 2.

Each of the ring gears 26, 35 within a particular side wall 4, 5 engage worm gears 27, 28 of a worm shaft 29, on which is fixedly mounted a spur gear 30 as shown in FIG. 4. The spur gear 30, in turn, is engaged by the drive gear 31 of a reversible drive motor 32. One of the worm gears has a right handed thread and one has a left handed thread, so that rotation of the worm shaft 29 by the drive motor 32 causes the engaged side disks 19, 20 to simultaneously rotate in opposite directions. Preferably, the worm gears 27, 28 are CONE Drive TM, a trademark of Textron, Inc., Traverse City, Mich., for a type of worm gear which transmits load to multiple teeth of a ring gear simultaneously.

Adjacent each end 17 of each pivot shaft 15, 16 is a vector load arm 33, 34 which is fixedly secured thereto. Within each side wall 4, 5, one vector load arm 33 is somewhat longer than the other vector load arm 34 for reasons discussed below. A vector flap synchronizing actuator 38 extends between the vector load arms 33, 34 in a particular side wall 4, 5, with an end 36, 37 of the vector flap synchronizing actuator 38 pivotably attached to each of the vector load arms 33, 34 at substantially equal distances from the pivot shafts 15, 16 to provide substantially equal torque to each of the pivot shafts 15, 16 when the vector flap synchronizing actuator 38 is actuated.

As those skilled in the art will readily appreciate, controlling the vector load arms 33, 34 through a mechanical linkage inherently introduces a certain amount of imprecision in the mechanical control system, and each additional linkage introduces additional imprecision. As shown in FIG. 4, the upper vector load arm 33 is positioned by a vectoring actuator 39 which is attached to both the vector load arm 33 and the static structure 40 of the nozzle 1. If positioning of the lower vector load arm 34 had to be achieved solely through the linkage provided by the vector flap synchronizing actuator 38, precise positioning of the lower vector load arm 34 would be reduced by the imprecision introduced by both the vectoring actuator 39 and the vector flap synchronizing actuator 38.

One of the somewhat longer vector load arms 33 is attached to each of the pivot shafts 15, 16 to directly and positively position each of the vectoring flaps 10, 11. Each vectoring flap 10, 11 is directly positioned by an actuator 39, 39' located between the corresponding load arm 33, 34 and the static structure 40. Thus, upper flap 10 is positioned as shown in FIG. 4 while lower flap 11 is positioned by actuator 39' shown in phantom.

Opposing the load on the vectoring flaps due to the exhaust gas requires substantial actuator force, necessitating the use of large, relatively heavy actuators 38. To minimize the weight of the present invention, within each of the sidewalls 4, 5 the single actuator 38 provides the necessary force to each vectoring flap 10, 11. Consequently, actuators which are significantly lighter, and faster actuating, can be used for the vectoring actuators 39, 39' to provide rapid vectoring of the exhaust gas.

Each of the seal flaps 12, 13 extends spanwisely between the side walls 4, 5 and is fixedly secured to a corresponding seal flap shaft 42, 43 disposed therein which also extends spanwisely across the nozzle 1. The ends 44 of each seal flap shaft 42, 43 protrude into the side walls 4, 5 through a seal shaft hole 45 which rotatably receives the seal flap shaft 42, 43. Adjacent each of the ends 44 of the seal flap shafts 42, 43 is a seal load arm 46, 47 which is fixedly secured thereto. A seal flap synchronizing actuator 48 connects the seal load arms 46, 47 in a particular side wall 4, 5, with an end of the seal flap synchronizing actuator 48 pivotably attached to each of the seal flap load arms 46, 47 at substantially equal distances from the seal flap shafts 42, 43 therein to provide substantially equal torque to each of the seal flap shafts 42, 43 when the seal flap synchronizing actuator 48 is actuated.

As in the case of the vector load arms 33, 34, a seal flap actuator 49 pivotably attached to each of the seal flap shafts 42, 43 via one of the seal load arms 46, 47 provides direct positioning of each of the seal flaps 12, 13. Each of the seal flap actuators 49 is pivotably mounted to the static structure 40 of the nozzle side walls 4, 5, preferably on opposite side walls 4, 5 of the nozzle 1 to provide symmetry of weight and actuator loading in the nozzle 1.

Referring back to FIG. 1, each of the vectoring flaps 10, 11 has an outer surface 50, 51 and an inner surface 52, 53 which meet at a trailing edge 54, 55. The leading edge 56, 57 of each vectoring flap 10, 11 is aerodynamically blended into the corresponding inner 52, 53 and outer 50, 51 surfaces to direct the exhaust gas 2 as described below. The pivot shafts 15, 16 preferably have diameters which are relatively large compared to the thickness of the vectoring flaps 10, 11, since, as those skilled in the art will readily appreciate, the larger diameter pivot shaft 15, 16 provides a larger contact area to fixedly secure the vectoring flap 10, 11 to the pivot shaft 15, 16 and can transmit more torque to the corresponding vectoring flap 10, 11 than could a smaller diameter shaft of the same weight.

Each of the seal flaps 12, 13 includes a transition section seal portion 58 and a vectoring flap seal portion 59. The transition section seal portion 58 includes a semi-cylindrical surface 60, 61 which mates with complementary surfaces 62, 63 of the transition section to prevent the exhaust gas 2 from flowing therebetween at all nozzle operating conditions. The semi-cylindrical surface 60, 61 of each seal flap 12, 13, blended into a concave inner surface 64, 65, provides a containment surface for the exhaust gas flowing from the transition section 6, 7 to the vectoring flaps 10, 11. The vectoring flap seal portion 59 of each seal flap 12, 13 has a trailing edge 66 capable of sealingly contacting the outer surface 50, 51 of the adjacent vectoring flap 10, 11 to prevent the exhaust gas 2 from flowing therebetween at selected nozzle operating conditions. The exterior surface 67, 68 of each seal flap 12, 13 is curved to provide a generally aerodynamic flow path for ambient air flowing along the nozzle exterior from the fairing flaps 69 to the outer surfaces 50, 51 of the vectoring flaps 10, 11.

As described above, the side disks 19, 20 mounted to a particular side wall 4, 5 are mechanically linked by the worm shaft 29. The gear ratio between the upper worm gear 27 and the upper ring gear 26 is the same as the gear ratio of the lower worm gear 28 and the lower ring gear 35, to provide for symmetric rotation of the side disks 19, 20. Since the pivot shafts 15, 16 are symmetric with respect to the nozzle central axis 14, the upper and lower pivot shafts 15, 16 remain symmetric about the central axis 14 at all nozzle operating conditions.

Figure 5:
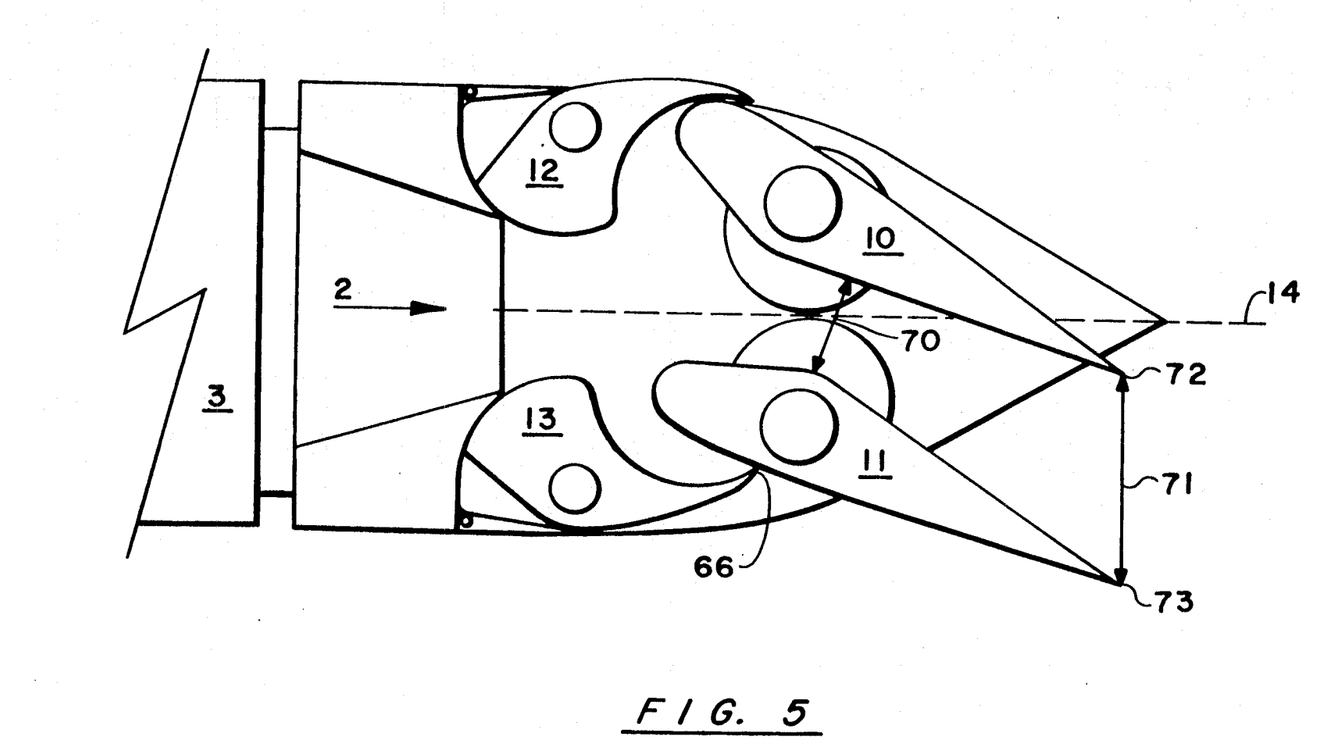
FIG. 5 is a cross-sectional view of the nozzle of the present invention in the vectored thrust mode.

During operation of the nozzle 1 according to the present invention in the vectored thrust mode as shown in FIG. 5, the desired throat area 70 of the nozzle 1 is achieved by rotating the side disks 19, 20, thereby moving the pivot shafts 15, 16 towards or away from each other. The desired exhaust area 71 is achieved by the vectoring flap synchronizing actuators 38 which rotate the vectoring flaps 10, 11 about their respective pivot shafts 15, 16 in opposite directions, thereby moving the trailing edges 72, 73 of the vectoring flaps 10, 11 towards or away from each other.

Vectoring of the vectoring flaps 10, 11 is achieved by the vectoring flap actuators 39 which simultaneously rotate both of the vectoring flaps 10, 11 clockwise or counterclockwise to achieve the desired angle of thrust vectoring. As those skilled in the art will readily appreciate, movement of the vectoring flaps 10, 11 requires coordination of the actuators 38, 39, 39' attached to the vector load arms 33, 34. For example, to reduce the exhaust area 71, the vector flap synchronizing actuators 38 move the vector load arms 33, 34 outward, movement which would be opposed by the vectoring flap actuators 39, 39' if neither of the latter were actuated.

By actuating only one vectoring flap actuator 39 in conjunction with the vector flap synchronizing actuators 38, one vectoring flap 10 rotates while the other 11 remains stationary. By actuating both of the vectoring flap actuators 39, 39' in conjunction with the vector flap synchronizing actuators 38, the vectoring flaps 10, 11 can be made to rotate uniformly towards or away from each other.

Figure 6:
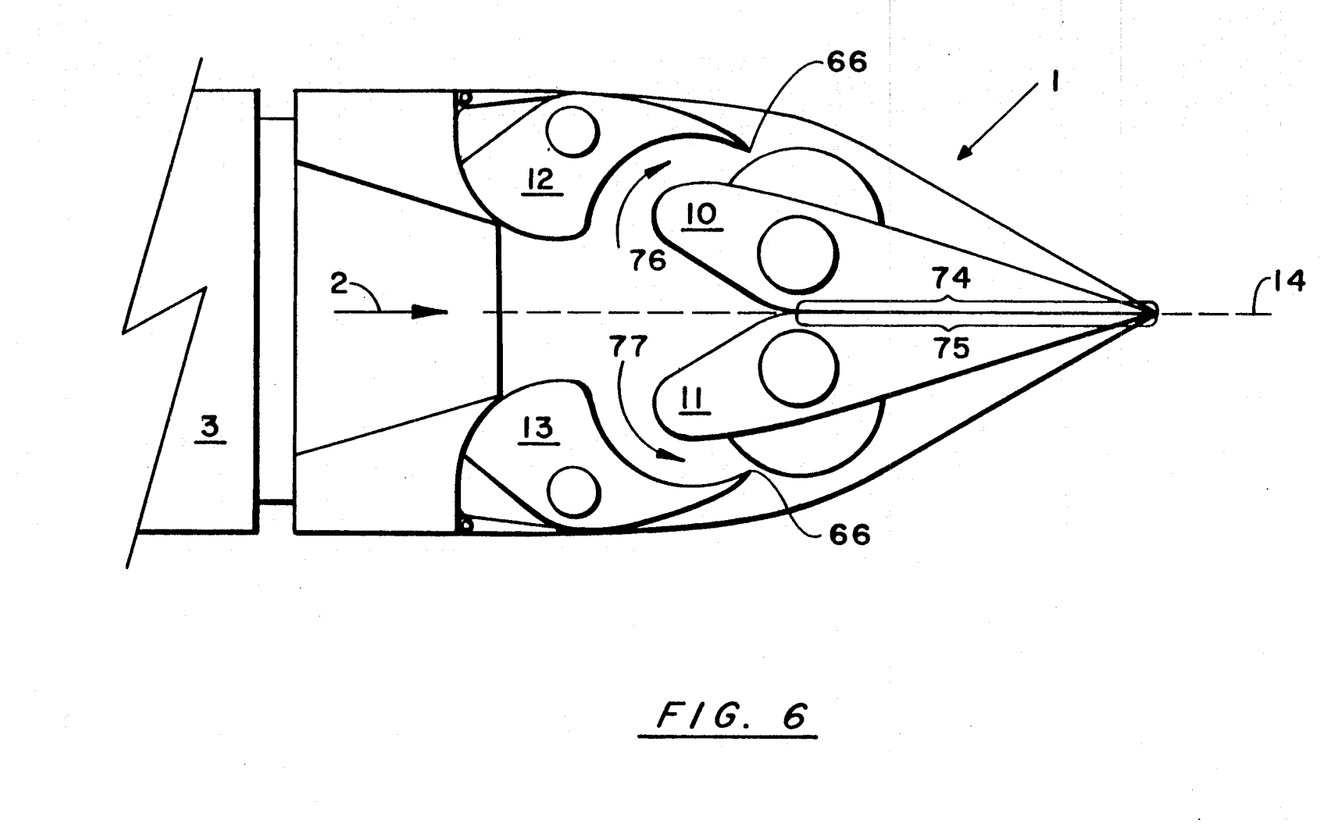
FIG. 6 is a cross-sectional view of the nozzle of the present invention in the low observability mode.

To provide low observability during certain flight conditions, each vectoring flap is rotated to a position in which a portion 74, 75 of the inner surface is parallel to the central axis 14 of the nozzle 1 using the vectoring flap actuators 39 and the vector flap synchronizing actuators 38. The side disks 19, 20 are simultaneously rotated to move the vectoring flaps 10, 11 towards each other until the parallel portions 74, 75 of the inner surfaces sealingly contact each other in the fully closed position, preventing flow of the exhaust gas 2 therebetween, as shown in FIG. 6. As those skilled in the art will readily appreciate, by maintaining the trailing edges 66 of the seal flaps 12, 13 in a fixed position as the vectoring flaps 10, 11 are moved towards each other, the decrease in flow area between the vectoring flaps 10, 11 is balanced by the increase in flow area between each of the seal flap trailing edges 66 and the adjacent vectoring flap 10, 11. As shown in FIG. 6, once the vectoring flaps 10, 11 are fully closed, all of the exhaust gas 2 must flow exteriorly of the vectoring flaps 10, 11 through the secondary flow passages 76, 77 which, due to their curvature, prevent line of sight viewing of the hot section.

Figure 7:
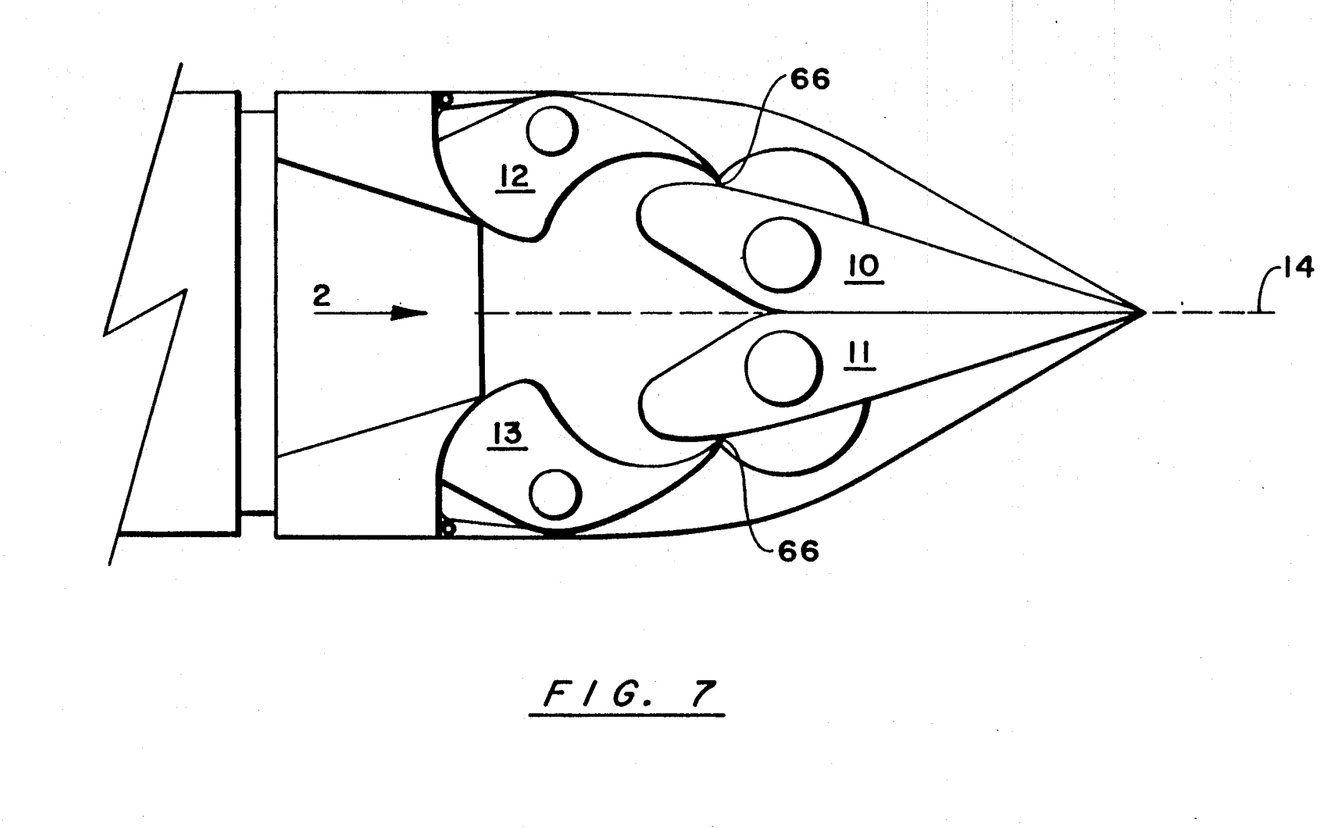
FIG. 7 is a cross-sectional view of the nozzle of the present invention in the blocked nozzle mode.

In some applications, such as VTOL, it may be desirable to close the nozzle 1 of the present invention entirely, as shown in FIG. 7, to direct the exhaust gas 2 to other portions of the aircraft (not shown). As those skilled in the art will readily appreciate, the independently actuatable seal flaps 12, 13 and vectoring flaps 10, 11 allow transition of the nozzle 1 from a flight mode to VTOL, or vice versa. For example, the VTOL configuration may be achieved by closing the seal flaps 12, 13 while the nozzle 1 is in the low observability mode described above, or by maintaining contact between the trailing edge 66 of each seal flap 12, 13 and the adjacent vectoring flap 10, 11 as the vectoring flaps 10, 11 are moved from an open to the fully closed position.

Although this invention has been shown and described with respect to detailed embodiments thereof, it will be understood by those skilled in the art that various changes in form and detail thereof may be made without departing from the spirit and scope of the claimed invention.

I claim:

1. A two-dimensional thrust vectoring exhaust nozzle for a gas turbine engine, the nozzle comprising:
   a static structure having first and second laterally spaced apart sidewalls, each of the sidewalls having an inner surface defining lateral exhaust boundaries in the nozzle;
   upper and lower movable flap assemblies, each flap assembly including a vectoring flap extending between the first and second sidewalls, the vectoring flap connected solely to a first shaft having ends which protrude into the sidewalls through pivot shaft holes in pivot members rotatably mounted in the sidewalls, the pivot shaft hole of each pivot member eccentric to the center of rotation thereof, each vectoring flap fixedly secured to the first shaft therein to prevent relative movement therebetween, and means for directing exhaust gas exteriorly of each vectoring flap; and, means for selectively positioning the vectoring flaps.

2. The nozzle according to claim 1 wherein the means for selectively positioning the vectoring flaps comprise:

first positioning means for positioning the vectoring flaps with respect to the pivot members; and second positioning means for positioning the pivot members with respect to the static structure.

3. The nozzle according to claim 2 wherein the first positioning means comprise:

vector load arms within each of the sidewalls connected to each of the pivot shaft ends for rotating the pivot shafts; and, first actuator means located in each of the sidewalls and connected to the vector load arms therein for positioning one of the vectoring flaps relative to the other vectoring flap.

4. The nozzle according to claim 3 wherein the first positioning means further comprise:

second actuator means located in each of the sidewalls and connected to one of the vector load arms therein, each of the second actuator means mounted to the static structure of the nozzle to position the vectoring flaps relative to the static structure.

5. The nozzle according to claim 4 wherein the second positioning means comprise:

third actuator means mounted in each of the sidewalls and engaging the pivot members to rotate the pivot members relative to the static structure.

6. The nozzle according to claim 5 wherein each of the pivot members comprise:

a side disk including a face substantially flush with the inner surface of the particular sidewall in which the side disk is mounted, and a ring gear rotatably mounted in the particular sidewall, wherein the ring gear is connected to the face by a side disk shaft to cause the face to rotate with the ring gear.

7. The nozzle according to claim 6 wherein each of the third actuator means comprise:

a worm shaft including two worm gears, and a spur gear, wherein one of the worm gears has a right-handed thread and one of the worm gears has a left-handed thread and each worm gear engages one of the ring gears to rotate the side disks in opposite directions when the spur gear is rotated by drive means.

8. The nozzle according to claim 7 wherein one of the second actuator means is connected to the load arm of one of the pivot members of the upper flap assembly, and one of the second actuator means is connected to the load arm of one of the pivot members of the lower flap assembly.

9. The nozzle according to claim 8 wherein each of the flap assemblies further comprise:

a seal flap extending between the first and second sidewalls and fixedly secured to a second shaft, the second shaft having ends rotatably mounted in the static structure, and third positioning means for selectively positioning the seal flap relative to the static structure.

10. The nozzle according to claim 9 wherein each of the seal flaps further comprise:

a vectoring flap seal portion adjacent one of the vectoring flaps, and a semi-cylindrical seal portion contacting the static structure of the nozzle to prevent the exhaust gas from flowing between the seal flap and the static structure section at all positions of the vectoring flap seal portion, wherein the vectoring flap seal portion is positionable between a first position at which the vectoring flap seal portion contacts the adjacent vectoring flap to direct all of the exhaust gas between the vectoring flaps, and a second position at which the exhaust gas flows between the vectoring flap seal portion and the adjacent vectoring flap.

11. The nozzle according to claim 10 wherein the third positioning means comprise:

seal load arms connected to each end of the second shaft for selectively positioning the seal flap in the first position and the second position, fourth actuator means located in each of the sidewalls and connected to the seal load arms therein for positioning one of the seal flaps relative to the other seal flap, and fifth actuator means located in one of the sidewalls and connected to one of the seal load arms therein, each of the fifth actuator means mounted to the static structure of the nozzle to position the seal flaps relative to the static structure.

12. A two-dimensional thrust vectoring exhaust nozzle for a gas turbine engine comprising:

a static structure having laterally spaced apart sidewalls, each of the sidewalls having an inner surface defining lateral exhaust boundaries in the nozzle;

upper and lower movable vectoring flaps extending between the sidewalls for vectoring the exhaust gas, each vectoring flap connected solely to a first shaft having ends which protrude into the sidewalls through pivot shaft holes in side disks rotatably mounted in the sidewalls, each first shaft end rotatably mounted within the pivot shaft hole in which it is received, the pivot shaft hole of each side disk eccentric to the center of rotation thereof, and each vectoring flap fixedly secured to the first shaft therein to prevent relative movement therebetween;

upper and lower seal flaps extending between the sidewalls, each seal flap fixedly secured to a second shaft having ends rotatably mounted in the static structure;

means for selectively positioning the vectoring flaps; and, means for selectively positioning the seal flaps; wherein the means for selectively positioning the vectoring flaps rotate the side disks to change the distance between the first shafts of the vectoring flaps, and rotate the vectoring flaps to change the orientation of the vectoring flaps with respect to the static structure.

13. The nozzle according to claim 12 wherein each of the seal flaps further comprise:

a vectoring flap seal portion adjacent one of the vectoring flaps, and a semi-cylindrical seal portion which contacts the static structure of the nozzle to prevent the exhaust gas from flowing between the seal flap and the static structure at all positions of the vectoring flap seal portion, wherein each vectoring flap seal portion is positionable between a first position contacting the adjacent vectoring flap to direct all of the exhaust gas between the vectoring flaps, and a second position at which substantially all of the exhaust gas flows between the vectoring flap seal portions and the adjacent vectoring flaps.

* * * * *

UNITED STATES PATENT AND TRADEMARK OFFICE
CERTIFICATE OF CORRECTION

PATENT NO. : 5,081,835

DATED : January 21, 1992

INVENTOR(S) : Joseph H. Ewing, Jr.

It is certified that error appears in the above-identified patent and that said Letters Patent is hereby corrected as shown below:

Column 8, line 4, delete "section",

Signed and Sealed this

Fourth Day of May, 1993

Attest:

MICHAEL K. KIRK

Attesting Officer

Acting Commissioner of Patents and Trademarks